United States Patent [19]

Yamanishi et al.

[11] Patent Number: 4,565,954
[45] Date of Patent: Jan. 21, 1986

[54] MULTIPOSITION CONTROLLER

[75] Inventors: Kazuhiro Yamanishi, Higashiosaka; Mino Mineo, Hirakata, both of Japan

[73] Assignee: Matsushita Electric Industrial Co., Ltd., Kadoma, Japan

[21] Appl. No.: 445,988

[22] Filed: Dec. 1, 1982

[30] Foreign Application Priority Data

Dec. 2, 1981 [JP] Japan .................... 56-194063

[51] Int. Cl.⁴ ............................... G05D 3/12
[52] U.S. Cl. .................... 318/603; 318/282; 318/467
[58] Field of Search ........... 318/603, 467, 672, 592, 318/547, 668, 666, 549, 557, 282, 286

[56] References Cited

U.S. PATENT DOCUMENTS

| | | | |
|---|---|---|---|
| 2,800,618 | 7/1957 | Giacoletto | 218/33 |
| 3,614,574 | 10/1971 | Hodges | 318/467 |
| 3,850,105 | 11/1974 | Aronstein | 318/592 X |
| 4,132,939 | 1/1979 | Kameyama | 318/467 X |
| 4,263,539 | 4/1981 | Barton | 318/672 X |
| 4,364,002 | 12/1982 | Suzuki | 318/603 X |
| 4,429,267 | 1/1984 | Veale | 318/603 X |
| 4,439,825 | 3/1984 | Donner | 318/603 X |

FOREIGN PATENT DOCUMENTS 1125520  3/1962  Fed. Rep. of Germany.
1918748  10/1970 Fed. Rep. of Germany.

Primary Examiner—William M. Shoop, Jr.
Assistant Examiner—Patrick C. Keane
Attorney, Agent, or Firm—Wenderoth, Lind & Ponack

[57] ABSTRACT

A multiposition controller includes a first switching element for switching on and off in accordance with a position of a movable object to be controlled and a second switching element for detecting the direction of movement of the object. The second switching element switches off when the object is positioned at one side from an initial position of the object, while it switches on when the object is positioned at the other side from the initial position of the object. Furthermore, the second switching element remains off or on when the object is positioned at the initial position. By such a simple structure, an accurate position control can be achieved.

3 Claims, 3 Drawing Figures

MULTIPOSITION CONTROLLER

BACKGROUND OF THE INVENTION

This invention relates to a multiposition controller for controlling a position of an object to be position-controlled.

Conventionally, when a movable object is to be position-controlled, a motor is rotated in accordance with absolute position information. This will be described as follows with reference to FIG. 1.

Referring to FIG. 1, reference numeral 1 designates a movable contact; numberal 2 designates an object to be controlled; numberal 3 designates a motor and numberal 4 designates a fixed contact; numeral 5 designates a controlling circuit and and numeral 8 designates a motor driving circuit. The movable contact 1 is mechanically coupled to the object 2, which in turn is designed to be driven by the motor 3. More specifically, when the motor rotates, the position of the object moves from a to b, c, d, . . . , n. At these respective positions corresponding fixed contacts 4 are connected to the movable contact 1.

Now, assuming that the object 2 is positioned at a position c and is to be moved to a position a, the information that the object 2 is at the position c is obtained from an input signal to the controlling circuit 5. So, the controlling circuit 5 outputs a control signal to the motor driving circuit 8 for causing the motor 3 to rotate so as to move the object to the position a. When the object 2 arrives at the position a, the motor 3 is stopped. At an initial state where the movable contact 1 is connected to the fixed contact 4, such movement can be achieved. On the other hand, at an initial state where the movable contact is not connected to any one of the fixed contacts 4, the motor 3 is first rotated in either direction so that the movable contact 1 is connected to one of the fixed contacts 4 before the above described movement of the object to the position a can be achieved. However, in this conventional case, the required number of fixed contacts and connecting lines between the fixed contacts and the controlling circuit 5 corresponds to the number of such multiple positions among which the object is to be moved. Furthermore, when such multiple positions are increased in number, the numbers of fixed contacts 4, connecting, lines and input terminals of the controlling circuit 5 must be increased likewise.

SUMMARY OF THE INVENTION

It is an object of this invention to provide a multiposition controller which is simple in construction and yet can achieve accurate position controlling for an object to be position-controlled.

This object is achieved according to this invention by providing a multiposition controller comprising: a first switching element for switching on and off in accordance with a position of a movable object to be controlled; and a second switching element for detecting a direction of movement of the object, wherein the second switching element switches off when the object is positioned at one side from an initial position of the object, while the second switching element switches on when the object is positioned at the other side from the initial position of the object, the off and on states remaining when the object is positioned at the initial position.

It is a further development of this invention that the multiposition controller further comprises: a counting means for up-counting or down-counting a signal of said first switching element responding to a driving signal for driving the object; and a pulse signal holding means for holding an up-counting state or a down-counting state of the counting means even when supply of the driving signal is stopped.

BRIEF DESCRIPTION OF THE INVENTION

This and other objects and features of this invention will be apparent from the following detailed description taken together with the accompanying drawings, in which.

Embodiments of this invention will now be described below.

Figure 1:
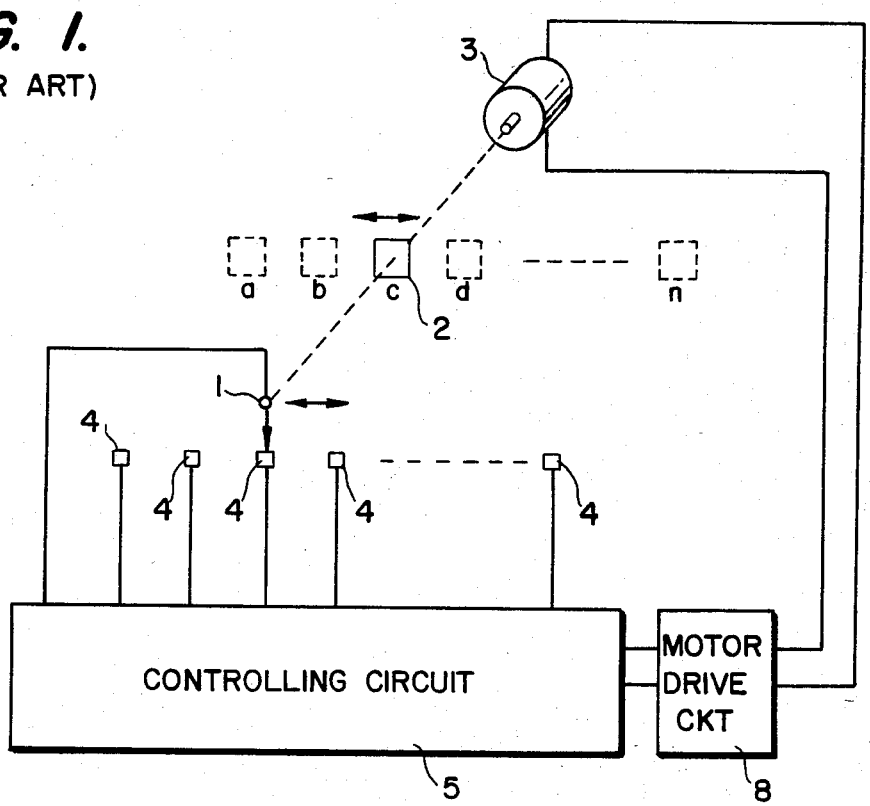
FIG. 1 is a schematic circuit diagram, partially in block form, of a conventional multiposition controller.
Figure 2:
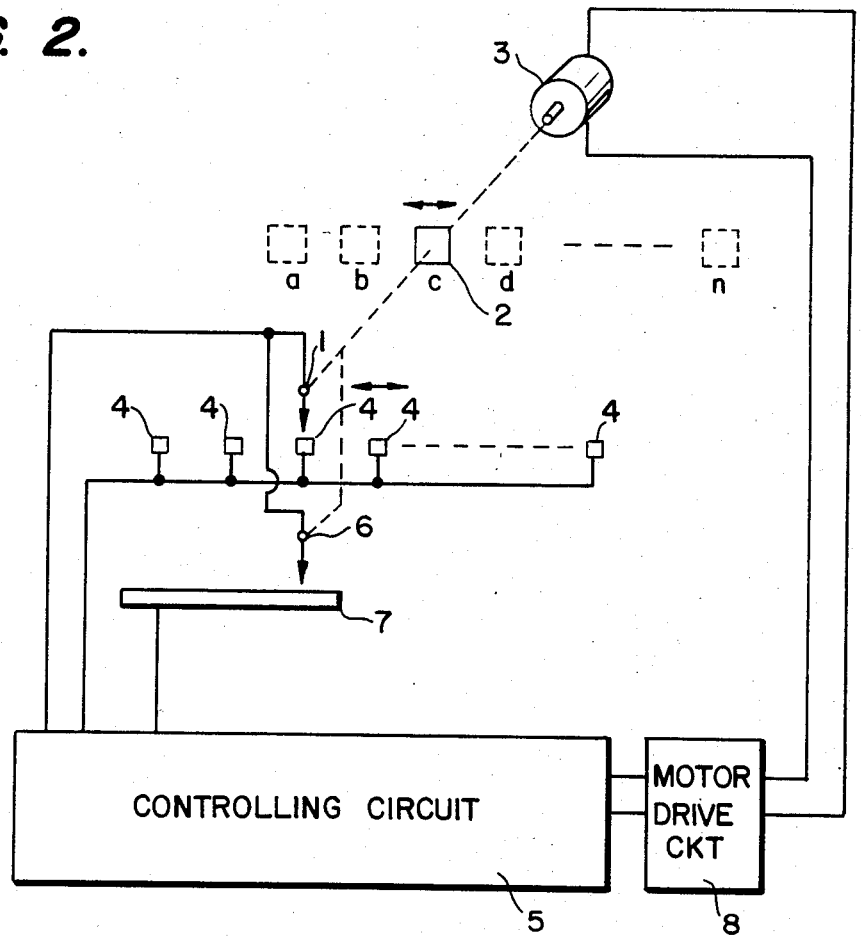
FIG. 2 is a schematic circuit diagram, partially in block form, of an example of a multiposition controller according to this invention.

Referring to FIG. 2, like structural elements therein as in FIG. 1 are designated by like reference numerals as in FIG. 1, and detailed descriptions thereof are omitted here. Reference numeral 6 designates a second movable contact, and numeral 7 designates a contact or switching element for detecting the direction of movement. Since the second movable contact 6 is added in FIG. 2, the element 1 is called the first movable contact in FIG. 2. These first and second movable contacts 1 and 6 are linked in operation. Furthermore, the fixed contacts 4 are connected by a single common line as shown. The contact 7 for direction detection is in contact with the second movable contact 6 at positions leftside from an initial position c, while the contact 7 is out of contact with the second movable contact at positions rightside from the initial position c. The initial position c is included in the positions leftside from the initial position c.

Next, the operation of this exemplified multiposition controller will be described. First let us assume that, at an initial state, the object 2 moves to an initial position c from any arbitrary position. For example, when the object 2 is at position a, the second movable contact 6 is in contact with the contact 7. So, such position can be detected as a position leftside from the initial position c, and thus the controlling circuit 5 outputs a driving signal for driving the object 2; more specifically, the controlling circuit 5 outputs a motor driving signal for driving the motor driving circuit 8 so as to rotate the motor 3 for the object 2 to move rightward. When the second movable contact 6 passes the initial position c and goes away from the contact 7, the object 2 is then moved back leftward until the first movable contact 1 gets into contact with a first fixed contact 4 after such back leftward movement. The position of such first fixed contact 4 is judged as the initial position by the controlling circuit 5, which at the same time outputs a driving or control signal to stop the rotation of the motor 3. In such manner, the object 2 can be brought to the initial position.

On the other hand, when the object 2 is at a position, for example position n, rightward from the initial position c, the second movable contact 6 is not in contact with the contact 7 for movement direction detection. So, the position of the object is judged, as being right-side from the initial position c, by the controlling circuit 5, which at the same time outputs a driving or control signal to move the object 2 leftward. Just as in the first mentioned case, the position, where the first movable contact 1 first gets into contact with a first fixed contact 4 after the second movable contact 6 gets into contact with the contact 7, is judged as the initial position by the controlling circuit 5, which at the same time outputs a driving or control signal to stop the rotation of the motor 3. That is, at whichever position the object 2 is positioned at an initial state, the object 2 can arrive at the initial position c in accordance with the same algorithm. By presetting a counting means in the controlling circuit 5 at an initial value at the time the object 2 arrives at the initial position c, and by up-counting or down-counting the counting means in accordance with breaking or making, namely switching off or on, between the first movable contact 1 and the fixed contact 4, the value of the counting means can be made to correspond to the moved position of the object 2. So, by moving the object 2 in accordance with such a counter value, the necessary multiposition controlling can be achieved.

Figure 3:
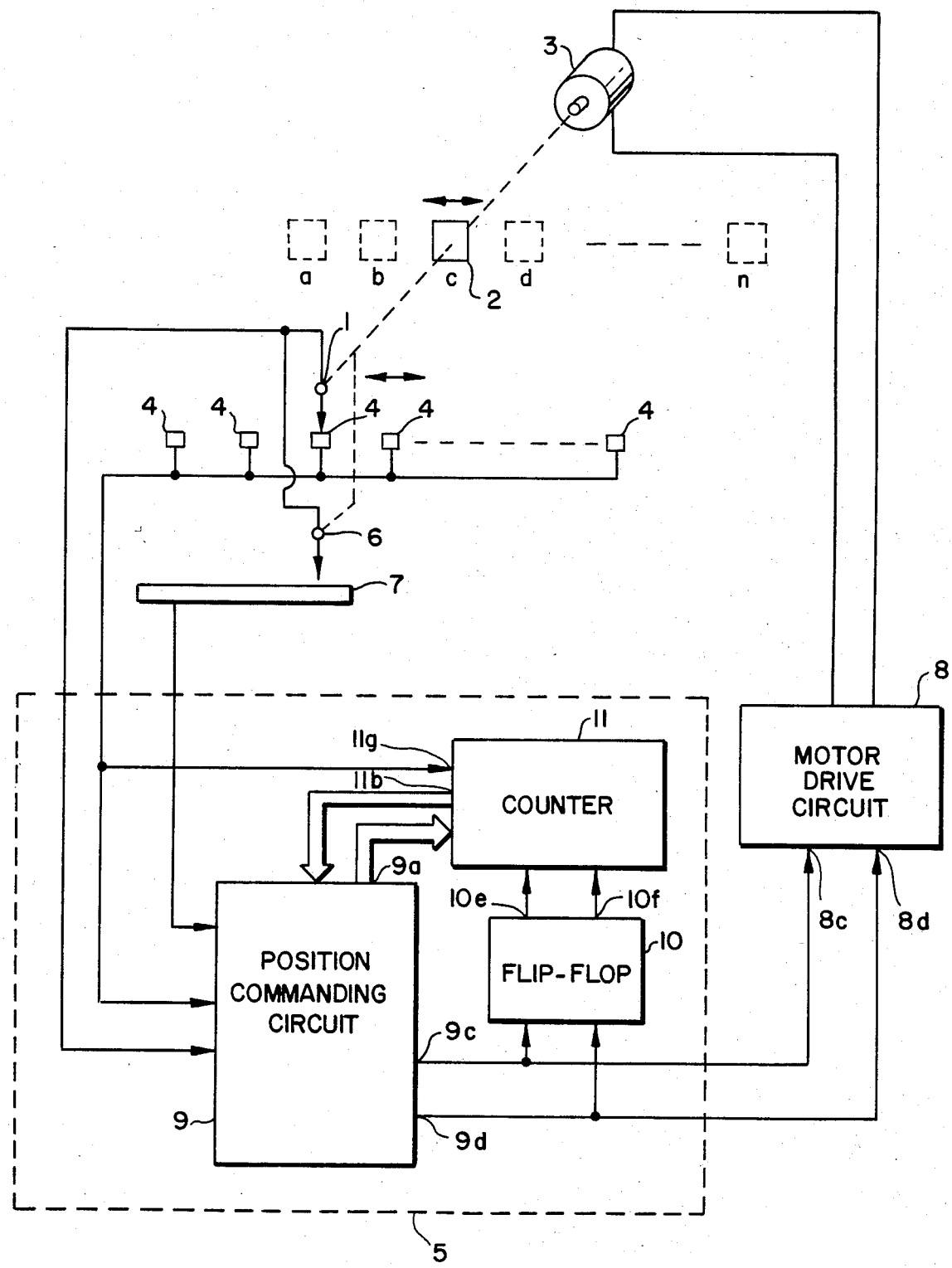
FIG. 3 is schematic circuit diagram, partially in block form, of a multiposition controller according to this invention, showing a specific example of a controlling circuit 5 of FIG. 1.

FIG. 3 shows a specific example of the controlling circuit 5 of FIG. 1, in which the controlling circuit employs a position commanding means, a counting means, and a pulse signal holding means for holding up-counting state or down-counting state of the counting means even when supply of the driving signal is stopped. Such a controlling circuit or means 5 is practically preferred to be integrally constructed by a single microcomputer which has functions of the position commanding means, the counting means and the pulse holding means without using discrete circuits respectively for the three means. However, for the sake of easier description and understanding, the three means are shown in FIG. 3 as discrete circuits.

Referring to FIG. 3, a position commanding means or circuit 9 achieves various judgements or detections as described above with reference to FIG. 2. That is, the position commanding circuit 9 receives various input signals from the contact 7, the fixed contacts 4, the first movable contact 1 and the second movable contact 6, and it outputs various driving or control signals to the motor driving circuit 8. The output signals of the position commanding circuit 9 are also supplied to the counting means or counter 11 for achieving the above described presetting, and further the output signals of the counter 11 are supplied back to the position commanding circuit 9 for achieving the movement of the object 2 in accordance with the counter value.

Next, the operation of the above counter 11 will be described. Let us assume now that a value "5" is preset in the counter 11 at the initial position c, and that the position commanding circuit 9 supplies output 9c to the input 8c of the driving circuit 8 of the motor 3 for causing the object 2 to move leftward. In such state, the counter 11 is set at its down-counting state by an output 10e of a flip-flop circuit 10. This flip-flop functions as a pulse signal holding means for holding an up-counting state or a down-counting state of the counter 11 when supply of the driving signal is stopped. Further, the fixed contact 4 is connected to an input 11g of the counter 11. So, at the moment the first movable contact 1 separates from a fixed contact 4, the counter 11 down-counts by "1". The counter 11 further down-counts by "1" at the moment the first movable contact 1 gets into contact with a fixed contact 4. So, the counter value of the counter 11 corresponding to the position b is "3".

Let us assume, on the other hand, that an output 9d is supplied to an input 8d of the motor driving circuit 8. In this state, the counter 11 is brought to its up-counting state by an output 10f of the flip-flop 10. So, just as in the above case, the counter 11 up-counts by "1", each time the first movable contact 1 breaks and makes (switches off and on) with a fixed contact 4. In this manner, the values of the counter 11 corresponding to the positions a, b, c and d are "1", "3", "5" and "7", respectively.

Sometimes, when the object 2 moves from the position b to the position c, it may happen that the position commanding circuit 9 may stop the motor rotation (namely supply a driving or control signal to stop the motor rotation) for some causes just before the objects 2 arrives at the position c while the first movable contact 1 is not in contact with any fixed contact 4. In such case, the motor still continues its rotation for a short time by its inertia, and stops soon. It may happen, in this case, that the first movable contact 1 finally gets into contact with a fixed contact 4, as a special case. However, by using a flip-flop 10 which remains at its up-counting or down-counting state even in such special case, the counting operation can be maintained. This is one of the features of this example of this invention, and thereby counting failure can be prevented, and an accurate counting corresponding to any position of the object 2 can be achieved.

As apparent from the foregoing descriptions, an accurate position controlling for arbitrary number of multiple positions can be achieved with basically only three connecting lines and by using e.g. a pulse signal holding circuit according to the multiposition controller of this invention. Furthermore, the initial position, e.g. position c, can be determined at a constant position. Still furthermore, by using a microcomputer or microprocessor for the controlling circuit, it is not necessary to modify a hardware portion of the multiposition controller, but only to modify a software portion of the multiposition controller, when the multiple positions increase or decrease in number. The use of such a microcomputer for the controlling circuit 5 is thus to be construed to fall within the scope of the following claims.

What is claimed is:

1. A multiposition controller for moving an object to a desired one of a plurality of predetermined positions, comprising:
    a means for driving said object;
    a first switching means comprising a first movable contact which is movable in association with said object within a range corresponding to a movable range of said object, and a plurality of fixed contacts which are connected in common with a single output line and arranged along said movable range of said contact so as to correspond to said plurality of predetermined positions of said object and so as to be sequentially in contact with said first movable contact as said movable contact is moved, said first switching means being in an on state only when said first movable contact is in contact with one of said plurality of fixed contacts;
    a second switching means for detecting a direction of movement of the object comprising a second movable contact which is movable in association with said first movable contact within a range corresponding to the movable range of said object and a single fixed contact extending along a portion of said movable range of said second movable contact including an end of said movable range of said second movable contact so as to be in contact with said second movable contact when said second contact is in a position which is within said portion of said movable range of said second movable contact, said second switching means being in an on state only when said second movable contact is in contact with said single fixed contact; and a control means for producing a control signal for controllng said drive means in accordance with a signal from said single ouptut line of said first switching means and an externally provided position assigning signal;

wherein said control means is further coupled to said second switching means for determining an initial position value by which values corresponding to said plurality of predetermined positions of said object are determined.

2. A multiposition controller according to claim 1, wherein said control means includes a counter for counting said signal from said single output line of said first switching means, said counter operating as an up counter or a down counter in accordance with said control signal, and wherein count values of said counter are used as said values corresponding to said plurality of predetermined positions.

3. A multiposition controller according to claim 2, wherein said control means further comprises a hold circuit for holding a direction signal which is generated by said counter and which indicates whether said counter is operating as an up counter or a down counter, and further comprises a counter which operates in accordance with an output signal from said hold circuit.

* * * * *